Nov. 21, 1967　　I. S. HARALAMPIEV ET AL　　3,353,198
AUTOMATIC NUT TAPPER AND TOOL FOR NUT THREADING
Filed Sept. 30, 1965　　2 Sheets-Sheet 2

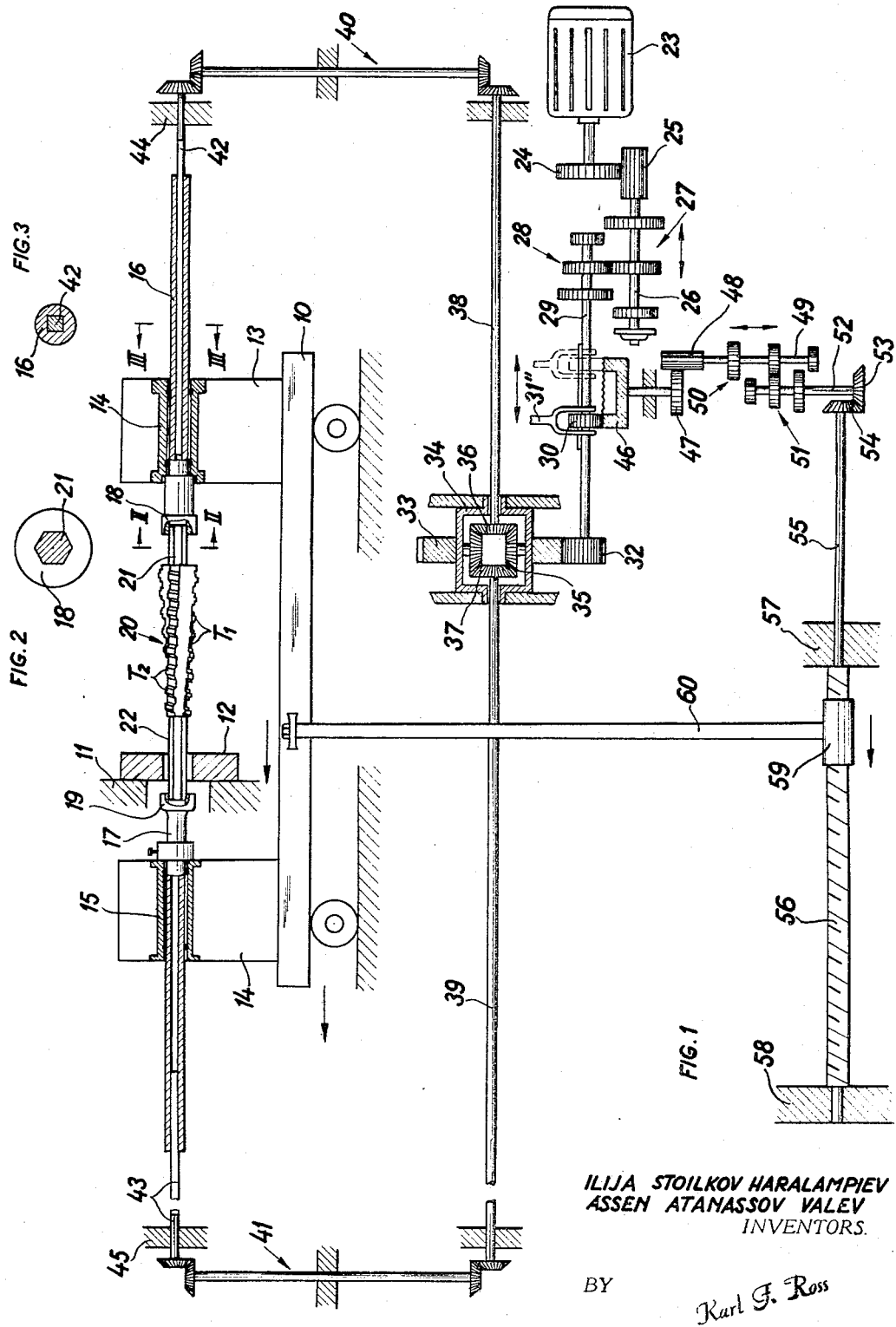

ILIJA STOILKOV HARALAMPIEV
ASSEN ATANASSOV VALEV
INVENTORS.

BY　Karl F. Ross
Attorney

United States Patent Office 3,353,198
Patented Nov. 21, 1967

3,353,198
AUTOMATIC NUT TAPPER AND TOOL
FOR NUT THREADING
Ilija Stoilkov Haralampiev and Assen Atanassov Valev,
Sofia, Bulgaria, assignors to Nautchno-Izsledovatelski
i Proektno-Konstruktorski Institut za Metalo-Obravot-
vashti Mashini i Instrumenti, Sofia, Bulgaria, a corporation of Bulgaria
Filed Sept. 30, 1965, Ser. No. 491,748
6 Claims. (Cl. 10—133)

This application is a continuation-in-part of our copending application Ser. No. 480,461, filed August 17, 1965.

Our present invention relates to an apparatus for the cutting of internal threads in a nut or a similar workpiece.

Short tapping tools suitable for such work are generally gripped at one end by a chuck and inserted by their other end into a bore of a workpiece to be formed with female threads. With tapping tools of greater axial length, such unilateral mounting is no longer satisfactory since the torque applied at one end has a tendency to twist the tool body and thus to deform the cutting edges of its peripheral teeth.

It is, therefore, the general object of our present invention to provide a thread-cutting apparatus adapted to utilize tapping tools of any reasonable length without objectionably deforming same.

A more particular object of this invention is to provide means in such apparatus for efficiently distributing the applied torque to the two ends of the tool.

The simultaneous application of torque to both ends of a thread-cutting tool represents, in itself, no particular problem at the present state of the art. It is merely necessary to couple an electric motor or other source of motive power via a mechanical distributor with two tool-gripping devices confrontingly aligned on a support therefor, this support being displaceable relatively to another support, carrying a workpiece to be threaded by the tool, in timed relationship with the rate of rotation. The obvious expedient of having the distributor apply equal torques to the two grippers is, however, unsatisfactory since, as we have found, it will lead to unrelieved stresses in the tool which not only shorten the lifespan of the latter but also tend to create binds between the cutting section of the tool and the partly threaded workpiece.

We have discovered, in accordance with the present invention, that these disadvantages are obviated if, in lieu of a rigid mechanical distributor, a differential gear is interposed between the power source and the two transmissions leading to the concurrently rotatable grippers, this differential gear permitting minor relative angular displacement of the two tool ends while still applying a constant combined torque to the tool.

Either the tool support or the workpiece may be held stationary though, of course, the necessary relative displacement may also be brought about by moving both supports in mutually opposite directions. We have found that interposition of a differential drive according to the invention between the power source and the two gripper assemblies produces a highly satisfactory cut since it permits temporary elastic deformation of the tool body, in response to variations in frictional resistance, while insuring that the average rate of speed will be the same at both ends so that the body will always revert to its basic shape.

Advantageously, the transmission system in an apparatus according to our invention also includes means for changing the speed and for reserving the sense of rotation of the grippers with reference to the relative motion of the two supports, thereby enabling selective use of tools designed for left-hand and right-hand threads and also for threads of different pitch.

The invention will be described in greater detail with reference to the accompanying drawing in which:

FIG. 1 is a somewhat diagrammatic view of an apparatus embodying our invention;

FIGS. 2 and 3 are cross-sectional views taken on the lines II—II and III—III, respectively, of FIG. 1.

Figure 4:
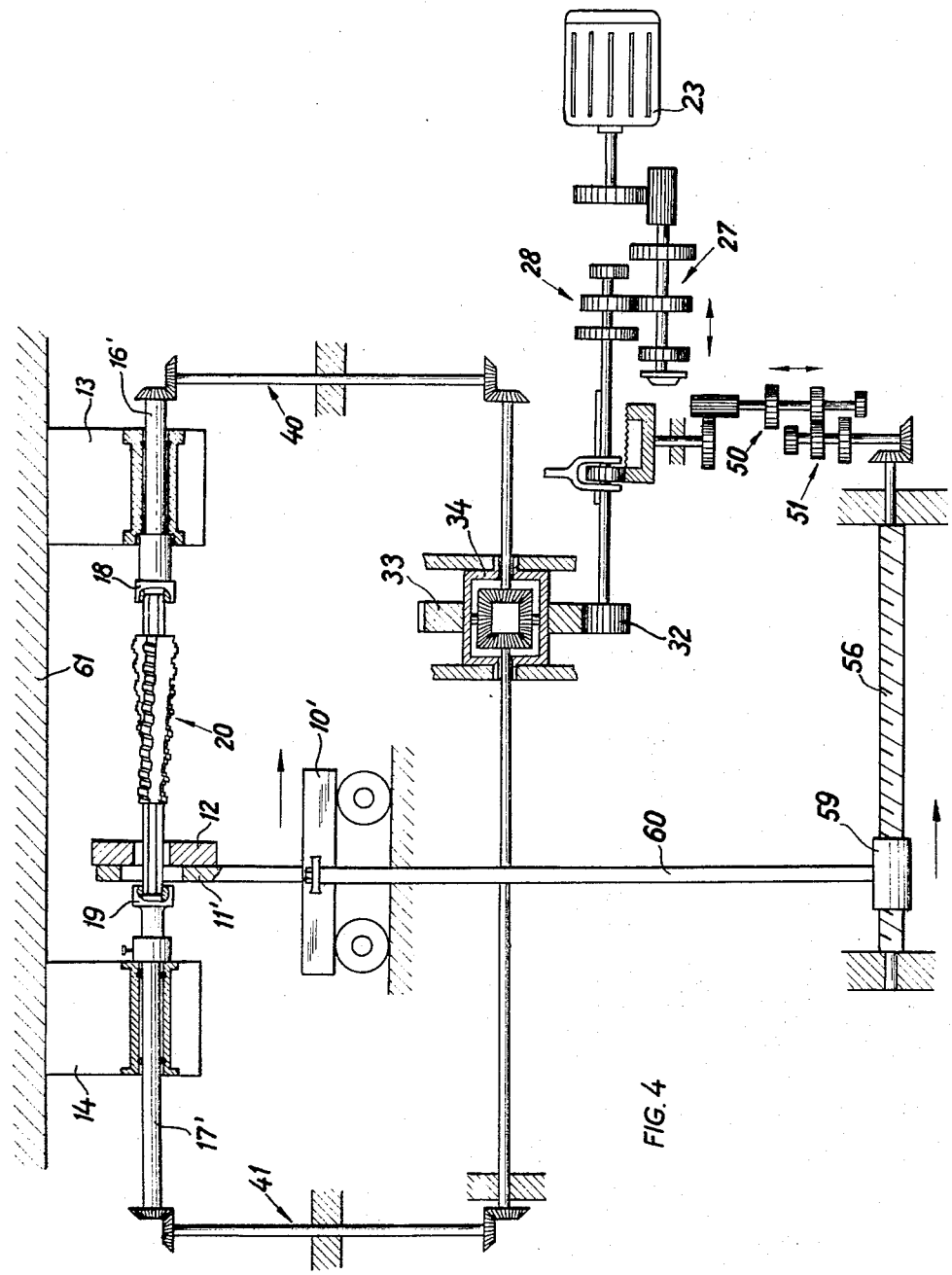
FIG. 4 is a view similar to FIG. 1, showing a modified system embodying our invention.

In FIGS. 1–3 we have illustrated an apparatus comprising a carriage 10 which is displaceable with reference to a fixed support 11, the latter having a workpiece 12 (i.e. the blank of a nut to be threaded) mounted thereon by any suitable means not further illustrated. Carriage 10 supports a pair of standards 13, 14 at a fixed mutual distance, these standards being positioned on opposite sides of the support 11 and being provided with bearings 14, 15 in which tubular stems 16, 17 are respectively journaled. The stems 16, 17 terminate in heads 18, 19 which are formed with recesses of polygonal outline adapted to grip complementarily polygonal extremities 21, 22 of a tapping tool 20 aligned with the bore of workpiece 12, as best illustrated in FIG. 2 for the assembly 16, 18.

The tool 20 may be of conventional design, except for having two extremities 21, 22 engageable by respective grippers; we prefer, however, to use a tapping tool of the type disclosed in our copending application Ser. No. 477,215 filed August 4, 1965, this tool having rows of teeth $T_1$ of stepped configuration alternating with teeth $T_2$ of substantially trapezoidal configuration; the height of the teeth within each row increases progressively from the end 22 to the end 21. In the position illustrated, tool extremity 22 engaged by gripper head 19 traverses the workpiece 12 preparatorily to a displacement of the carriage 10 toward the left and concurrent rotation of the tool 20 in a sense and at a rate determined by the pitch of a helicoidal line along which successive teeth $T_1$, $T_2$ are arrayed on the periphery of the tool body, thereby cutting a progressively deepening helical groove into the bore of blank 12 to produce a female thread.

The desired carriage movement and gripper rotation are brought about by a drive mechanism which comprises a motor 23 having a pinion 24 in mesh with an elongated gear 25 on an axially shiftable auxiliary shaft 26. A set of stepped gears 27 on shaft 26 may be selectively interengaged with complementary gears 28 on a main drive shaft 29 to which a reversing gear 30 is slidably keyed for axial displacement by means of a forked handle 31. A similar handle for the displacement of shaft 26 has not been illustrated.

Shaft 29 carries a pinion 32 which engages a spur gear 33 on a differential housing 34. Two or more planetary gears 35 in housing 34 mesh in the well-known manner with a pair of sun gears 36, 37 whose shafts 38, 39 are coupled via respective bevel-gear transmissions 40, 41 with a pair of rods 42, 43 respectively journaled in bearings 44, 45 with a polygonal (e.g. square) profile matingly received in a polygonal bore of tubular stems 16 and 17, respectively; see particularly FIG. 3 for the members 16 and 44. Thus, the stems 16, 17 and the rods 42, 43 constitute a pair of telescoping input shafts for concurrent application of torque to the ends 21, 22 of the tool 20. The differential gear mechanism 32–39, representing an essential feature of our invention, is similar to the one disclosed in our copending application Ser. No. 480,461.

Gear 30 is reversibly engageable with a crown gear 46 which in turn drives a pinion 47 in mesh with elongated gear 48 on an auxiliary shaft 49. This shaft is slidable, in the same manner as shaft 26, for selectively engaging a set of stepped gears 50 with complementary gears 51 on a further shaft 52 bearing a bevel gear 53. A bevel gear 54, meshing with gear 53, drives a shaft 55 which is rigid with a lead screw 56 journaled in bearings 57, 58. A nut 59 matingly surrounds the lead screw 56 and is rigid with a bar 60 which ties it to the carriage 10.

As will be readily apparent from the foregoing description, operation of motor 23 will advance the carriage 10 via lead screw 56 at a rate determined by the axial position of speed-changing shaft 49 and in a direction controlled by the position of reversing gear 30. The speed of lead screw 56 is further determined by the speed-changing assembly 27, 28 which also controls the speed of the differential housing 35. In this manner it is possible to select a desired overall drive speed by means of shaft 26 and a suitable relative speed of carriage 10 and grippers 18, 19 by means of shaft 49, the sense of rotation of the grippers with reference to the direction of carriage motion being chosen by means of handle 31. Naturally, the motor 23 may itself be reversible to facilitate extraction of the tool from a partly or completely tapped workpiece.

The apparatus of FIG. 4 is generally similar to that of FIG. 1 and identical reference numerals have been used where applicable. The modification resides in the fact that a stationary support 61 carries the posts 13, 14 for the tool grippers 18 and 19 whose stems 16', 17' are of fixed length and directly attached to bevel gears forming part of the transmissions 40, 41. Conversely, a carriage 10' is rigidly connected with a movable support 11' for the workpiece 12, the carriage 10' being linked with the lead nut 59 by a bar 60 in the manner described for carriage 10 of FIG. 1.

The system of FIG. 4 represents thus merely a kinematic reversal of the apparatus of FIG. 1 and the operation of the two drive mechanisms is essentially the same.

We claim:
1. An apparatus for the cutting of internal threads, comprising:
    first support means adapted to have mounted thereon a perforated workpiece to be provided with internal threads;
    second support means displaceable with reference to said first support means;
    confrontingly aligned first and second gripper means on said second support means engageable with opposite ends of an elongated tapping tool to be introduced into said workpiece;
    a source of motive power;
    first transmission means coupling said source with said first gripper means for imparting rotation thereto;
    second transmission means coupling said source with said second gripper means for rotating same in unison with said first gripper means;
    third transmission means coupling said source with one of said support means for displacing same in timed relationship with the rotation of said first and second gripper means;
    and differential gear means linking said first and second transmission means with said source.

2. An apparatus as defined in claim 1 wherein said first and second gripper means comprise a pair of spindles and first and second mounting means individually locating said spindles on said second support means, at least one of said mounting means being releasable for permitting relative adjustment of said spindles in longitudinal direction.

3. An apparatus as defined in claim 1, further comprising speed-changing means operatively coupled with at least said third transmission means.

4. An apparatus as defined in claim 3 wherein said speed-changing means is interposed between said source and said differential gear means.

5. An apparatus as defined in claim 1, further comprising reversing means in said third transmission means for changing the sense of relative movement of said support means.

6. An apparatus as defined in claim 1 wherein said third transmission means comprises a lead screw and a nut in engagement therewith, said nut being mechanically connected with said one of said support means.

References Cited

UNITED STATES PATENTS

| | | | |
|---|---|---|---|
| 922,248 | 5/1909 | Bilgram | 10—133 |
| 1,012,294 | 12/1911 | Taylor | 10—133 |

LEONIDAS VLACHOS, *Primary Examiner.*